United States Patent [19]

Larson et al.

[11] 4,127,152
[45] Nov. 28, 1978

[54] MOBILE TREE PROCESSOR

[75] Inventors: Robert W. Larson, Port Arthur, Canada; John P. Lundberg, Washburn, Wis.

[73] Assignee: FMC of Canada, Ltd., Scarboro, Canada

[21] Appl. No.: 186,439

[22] Filed: Oct. 4, 1971

Related U.S. Application Data

[63] Continuation of Ser. No. 727,431, May 8, 1968, abandoned.

[51] Int. Cl. ............................................. A01g 23/08
[52] U.S. Cl. .......................... 144/3 D; 144/309 AC
[58] Field of Search ..................... 144/3 D, 2 Z, 34 E, 144/309 AC

[56] References Cited

U.S. PATENT DOCUMENTS

| | | | |
|---|---|---|---|
| 3,102,563 | 9/1963 | Horncastle | 144/3 D |
| 3,196,911 | 7/1965 | Busch et al. | 144/3 D |
| 3,252,487 | 5/1966 | Larson et al. | 144/3 D |
| 3,348,592 | 10/1967 | Winblad et al. | 144/3 D |
| 3,356,116 | 12/1967 | Brundell et al. | 144/3D |
| 3,398,774 | 8/1968 | Hahn | 144/309 AC |

*Primary Examiner*—Gerald A. Dost

*Attorney, Agent, or Firm*—F. W. Anderson; A. J. Moore

[57] ABSTRACT

An articulated boom assembly is mounted on a vehicle for swinging movement about a vertical axis. A shear-grapple unit is pivotally attached to the free end of the boom assembly so that after a standing tree has been cut, it may be tilted from a vertical position to a horizontal position. When the cut tree is positioned horizontally above the vehicle, it can be lowered into a stationary delimbing head and also at the same time to a clamping mechanism that travels longitudinally of the vehicle for the purpose of feeding the tree toward a shear mechanism, the delimbing of the tree taking place as this is done. When advanced to a predetermined distance beyond the shear mechanism, the shear mechanism is actuated to sever the first bolt which drops onto an inclined annular plate that has a U-shaped yoke projecting upwardly through its central opening. When the yoke is rotated through 90°, a spring yields under the weight of the bolt so that the bolt is free to roll into a collector. After the collector has become full, it is elevated and a pair of pivotal arms that normally close the bottom opening of the collector arm swung downwardly to permit the bolts in the collector to be dumped in a pile onto the ground.

8 Claims, 3 Drawing Figures

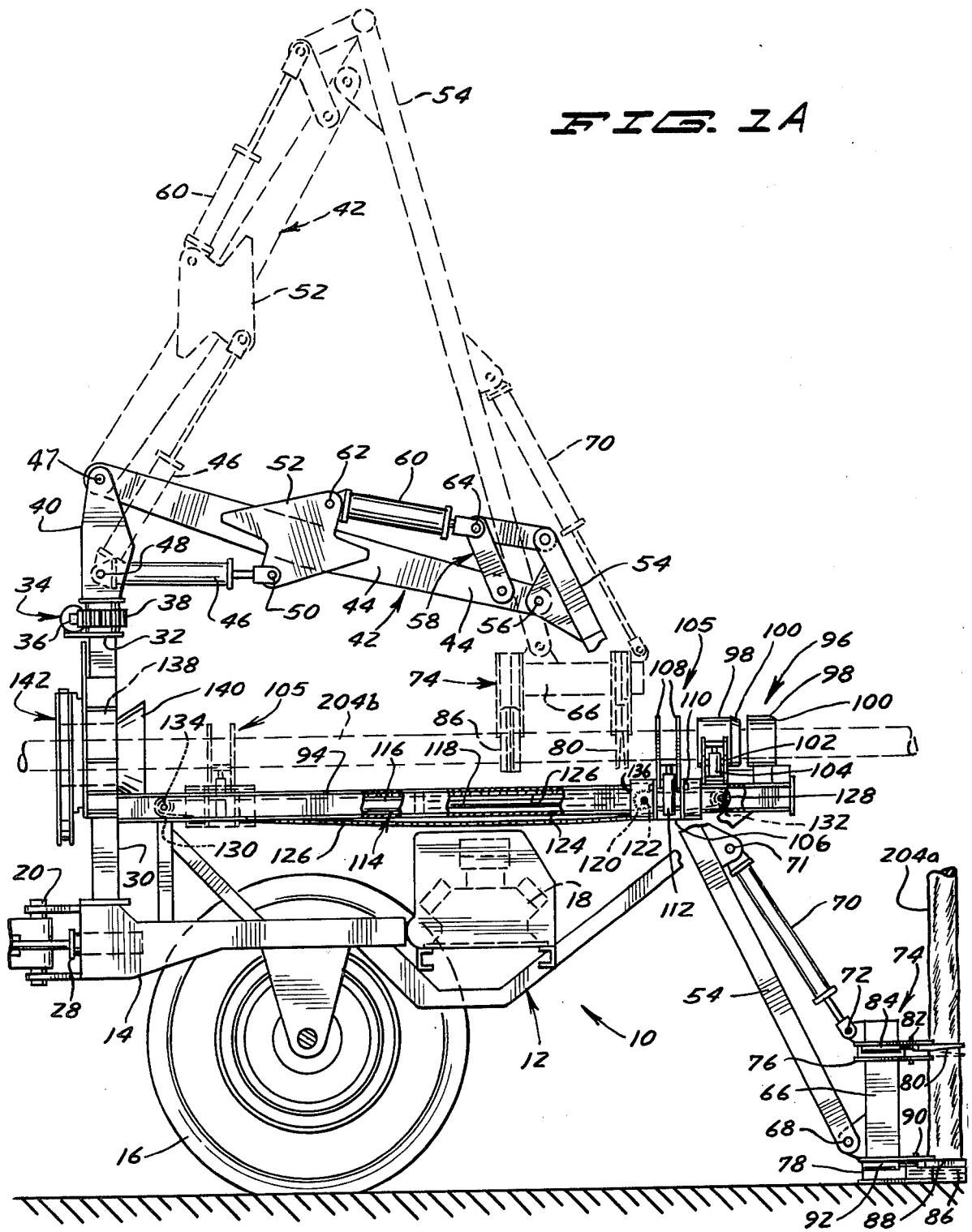

MOBILE TREE PROCESSOR

This is a continuation of our application Ser. No. 727,431, filed May 8, 1968, now abandoned.

CROSS-REFERENCE TO RELATED APPLICATION

The shear mechanism herein described in depicted in U.S. Pat. No. 3,509,922, granted May 5, 1970 to John P. Lundberg, and titled "THREE-BLADE SHEAR MECHANISM FOR CUTTING TREE-LENGTH LOGS," and assigned to the same assignee as the present application.

BACKGROUND OF THE INVENTION

1. Field of the Invention

This invention relates generally to the harvesting of trees, and pertains more particularly to apparatus that cuts standing trees, delimbs them, cuts them into bolts and then collects the bolts until a sufficient number has been accumulated so that they can be dumped onto the ground in a pile suitable for being picked and hauled to a debarker and chipper.

2. Description of the Prior Art

Various kinds of apparatus have been devised and utilized in the past for harvesting trees. Some of the equipment has been quite cumbersome and complex. While this type of equipment has operated satisfactorily, a substantial financial investment must be made in the procurement thereof.

Various types of mobile equipment have also been marketed, but this equipment has certain shortcomings, mainly, the fact that the standing trees cannot be completely processed from their standing condition as they are found in the forest into bolts or sticks of a length convenient for further handling or forwarding to a debarking and chipping apparatus that might be located at a remote point.

SUMMARY OF THE INVENTION

The invention utilizes a boom assembly having at its free end a unit that will hold the standing tree while it is being cut. Thereafter, the tree can be oriented into a horizontal position for both delimbing and shearing. After shearing, the bolts or sticks are turned through 90° so as to allow them to roll directly into a collector. The collector can be raised and lowered, it being in its lower position to receive the bolts as they roll downwardly after being turned through 90°. The collector, however, is raised in order to permit the bolts that have been accumulated to drop or be discharged onto the ground. Accordingly, the invention will find particular utility in the processing of standing trees into bolts or sticks of useable length.

The present invention has for an object the provision of apparatus that is relatively compact and which possesses the capability of moving at will through over adverse terrain. It is also an aim of the invention to have all of the equipment mounted on the vehicle itself that will cut the standing trees, remove the limbs therefrom, sever them into useable lengths, and place them on the ground in such a manner as to render them suitable for immediate or subsequent rehandling. It is also within the contemplation of the invention to have these operations performed at a rate or speed economically attractive to the logging industry. Still further, it is an object of the invention to provide such apparatus at a cost that will encourage its wide spread use, especially by relatively small-scale logging operations.

BRIEF DESCRIPTION OF THE DRAWING

FIGS. 1A and 1B constitute a single view when FIG. 1A is placed to the right of FIG. 1B, the swivel that connects the tractor (FIG. 1A) to the trailer (FIG. 1B) appearing in both figures to permit the figures to be keyed together.

DESCRIPTION OF THE PREFERRED EMBODIMENT

Figure 1B:
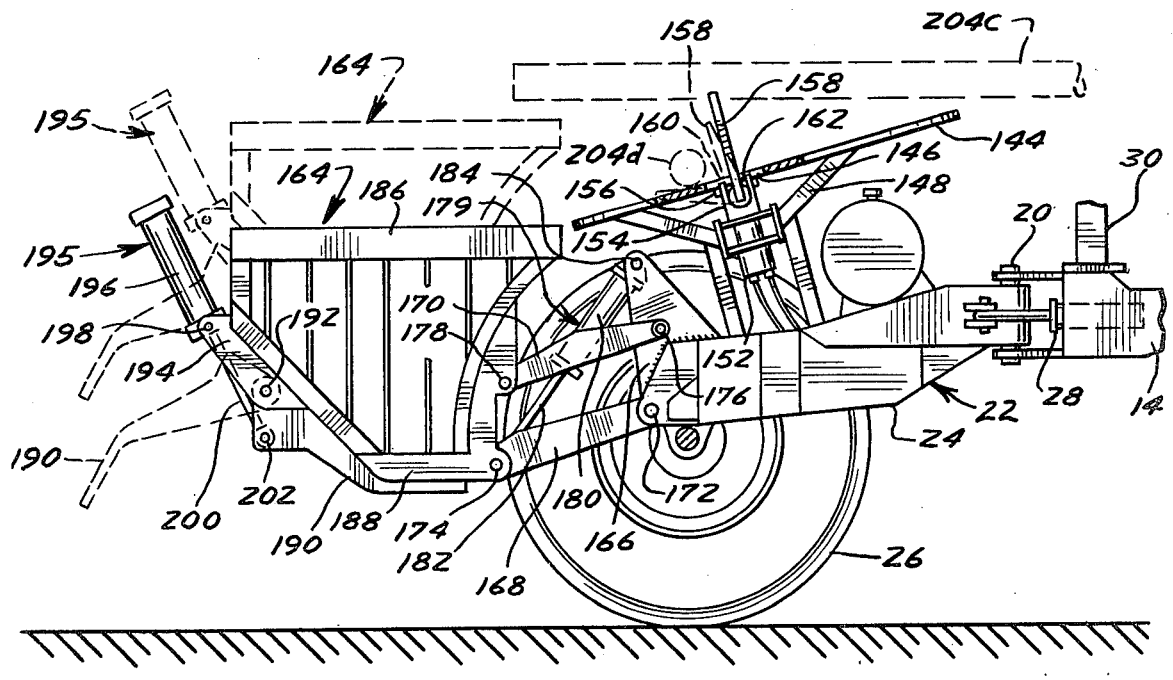

In the single view constituting FIGS. 1A and 1B, a vehicle has been shown which has been designated generally by the reference numeral 10. As illustrated in FIG. 1A, the vehicle includes a tractor 12 having a chassis 14 provided with a pair of drive wheels 16, there being an engine 18 that supplies rotative power to said wheels 16. It will be discerned that a swivel 20 connects the tractor to a trailer 22 shown in FIG. 1B, the swivel 20 appearing in both figures to facilitate alignment. The trailer 22 includes a chassis 24 provided with wheels 26. In order to steer the vehicle 10, there is a pair of steering rams 28, there being one at either side of the vehicle and one such ram 28 appearing in the drawing in both FIGS. 1A and 1B.

The processing equipment carried on the vehicle 10 will now be described. First, it is to be observed that an upright mast 30 is mounted on the chassis 14 of the tractor 12. Adjacent the upper end of the mast 30 is a bracket support 32 for a ram 34 that actuates a rack 36. The rack 36 is in mesh with pinion gear 38. This arrangement is very similar to that shown in U.S. Pat. No. 3,294,131, for "SHEAR CLAMPING MECHANISM," granted on Dec. 27, 1966 to Robert W. Larson and assigned to the same assignee as the present invention. The pinion 38 is integral with a capstan 40. In this way, the rack 36, when extended or retracted, will cause the pinion 38 to rotate and hence in turn cause the capstan 40 to swing about a vertical axis.

The capstan 40 supports an articulated boom assembly 42 composed of a main boom 44 which is elevated by a main boom lift ram 46, the main boom 44 being pivotally connected to the capstan 40 by means of a pivot pin 48. A second pivot pin 50 connects the ram 46 to an outwardly spaced portion of the main boom 44 so as to provide the necessary moment arm for elevating and lowering the main boom 44. It will be discerned from FIG. 1A that a pair of journal plates 52 are welded to the sides of the main boom 44 and that the pivot pin 50 extends laterally between these two journal plates. The boom assembly 42 further includes a reach or knuckle boom 54 (a central section of the boom 54 being removed to expose to view other parts hereinafter referred to) that is connected to the main boom 44 through the agency of a pivot pin 56. Parallel linkage indicated generally by the reference numeral 58 is employed for actuating the reach boom 54. It is through this parallel linkage 58 that a reach boom ram 60 is connected, there being a pivot pin 62 extending between the journal plates 52 in the same manner as the pin 50. A second pivot pin 64 connects the ram 60 to the linkage 58.

The foregoing description relates to the components constituting the boom assembly 42. At the free end of this boom assembly 42, more specifically the reach boom 54, is attached a tilt mast 66, a pivot pin 68 serving as the connecting means. There is, however, a tilt ram 70 that has one end connected or attached to the reach boom 54 by a pin 71 and connected to the tilt mast 66 by a second pin 72. Hence, it will be readily apparent that when the piston rod forming, a part of the tilt ram 70 is either extended or retracted, that the tilt mast 66 is angularly shifted. The need for this will become clearer as the description progresses.

The tilt mast 66 provides support for what will be termed a grapple-shear unit 74. Accordingly, there is provided an upper head 76 and a lower heat 78. It is on the upper head 76 that a pair of grapple jaws 80 are mounted by reason of pivot pins 82. Individual rams 84 are provided for each of the jaws 80, one such ram 84 being visible in FIG. 1A.

It is the lower head 78 that provides support for a pair of butt shear blades 86 having integral gripping flanges 88 that function to hold, assisted by the grapple jaws 80, the tree after it has been cut or severed from its rooted stump. Pivot pins 90 mount the shear blades 86 for scissors-like movement, the actuation being derived by a pair of rams 92, one of which is visible in FIG. 1A.

At this time attention is directed to a pair of laterally spaced longitudinal rails 94 that together constitute a track, the need for which will be presently described. The reason for mentioning the rails 94 at this point is that they serve as a fixed support for delimbing head 96 comprised of a pair of delimbing blades 98 formed with knife edges 100. The delimbing blades 98 are pivotally attached to opposite sides of the rails 94 by pivot pins 102, a pair of rams 104 actuating the delimbing blades 98 toward or away from each other. When the blades are actuated inwardly toward each other, they perform their delimbing function.

Passing now to a description of the clamping mechanism 105 which cooperates with the delimbing blades to pull or feed the cut tree, there is included a carriage 106 movable along the rails 94. In other words, the carriage is constrained for movement forwardly and rearwardly with respect to the tractor 12, being guided by the rails 94. The carriage 106 has mounted thereon a pair of clamping jaws 108, these jaws being pivotal toward and away from each other by means of pivot pins 110. The jaws 108 are actuated either into a clamping or release relationship with the cut tree by a pair of rams 112.

The particular means for moving the clamping mechanism 105, which includes the carriage 106, is actuated forwardly and rearwardly along the track formed by the rails 94 between its solid line position at the right and its phantom line position at the left in FIG. 1A. Preferably, the actuating means will be in the form of a sheave mechanism somewhat similar to that depicted in U.S. Pat. No. 3,252,487, granted on May 24, 1966 to Larson et al. for "APPARATUS FOR DELIMBING AND FELLING TREES." The mechanism, irrespective of the specific form thereof, suggestively involves the employment of a ram 115 having a cylinder 116 and a piston rod 118, portions of one of the rails 94 being broken away to show the ram parts that reside intermediate the rails 94. As explained above, a shear mechanism would usually be operated by such a ram 114 in order to produce the requisite amount of motion multiplication, more specifically a multiplication factor of two in order to move the carriage 106 from the extreme right or forward position to the extreme left or rearward position.

To give the desired motion multiplication that will result from the extension and retraction of the piston rod 118, it again being emphasized that it is desirable to keep the drawing as simple as possible, an actuating cogwheel 120 is mounted on a short shaft 122 at the free end of the piston rod 118. Since the piston rod 118, as well as its cylinder 116, lie between the rails 94, the wheel 120 and shaft 122 appear in dotted outline. Also, there is a chain or gear rack 124 that is fixedly mounted between the rails 94 and the cogwheel 120 is in mesh with this rack 124. To obtain the multiplication factor of two, though, a continuous chain 126 is entrained about additional cogwheels 128 and 130, the cogwheel 128 is mounted for rotation on a shaft 132 journaled between the two rails 94 and likewise the cogwheel 130 is mounted for rotation on a second shaft 134 similarly mounted. At 136 the chain 126 is attached to the carriage 106 so as to pull the carriage forwardly and rearwardly along the rails 94, depending upon whether the piston rod 118 is being extended or retracted. It will be appreciated, it is believed, that only a limited amount of power is required for moving the carriage 106, enough being needed in order to effect the delimbing operation which is achieved as the cut tree is advanced or fed to the left.

A guide shell or sleeve 138 is fixedly mounted so that the left end of the cut tree can be inserted therein, there being a flared entranceway 140 which assures that the tree is properly introduced into the shell 138.

A shear mechanism 142 is shown only generally in FIG. 1A because the specific details thereof constitute the subject matter of the copending application hereinbefore alluded to and which has been termed "MOBILE TREE PROCESSOR." It is believed obvious that the clamping mechanims 105 which includes the carriage 106 and the clamping jaws 108 must feed or advance the tree into juxtapositions with the shear mechanism 142.

Figure 2:
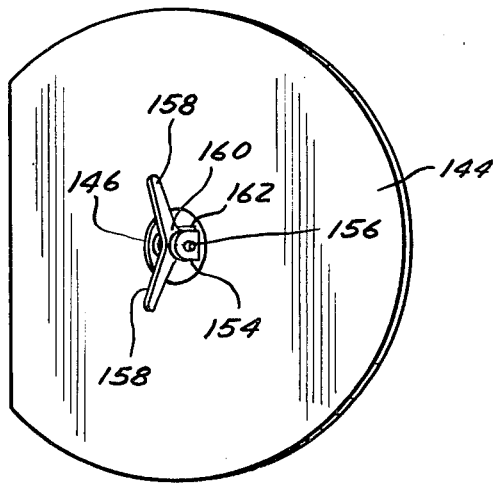
FIG. 2 is a detail top plan view of the annular plate and yoke that turns the bolts through 90°.

As illustrated in FIG. 1B, this portion of the drawing picturing the trailer 22, there is an inclined annular plate 144 having a central aperture opening 146, a portion of the plate 144 being removed to show said openings; the plate 144 and its opening 146 can be seen to better advantage in FIG. 2. As indicated, the plate 144 is fixedly mounted and a support or frame 148 on the chassis 24 provides the fixed support for said plate. The frame 148 also serves as the mounting means for a rotary type hydraulic motor 152. The shaft of the motor 152 carries a clevis 154 that has a pin 156 extending thereacross. It is on the pin 156 that a V-shaped yoke 158 is pivotally mounted, the yoke having a notch 160 of sufficient size so as to receive therein the bolt after it has been severed by the shear mechanism 142. A leaf spring 162 (or a suitably coiled spring) on the clevis 154 normally biases the yoke 158 into an upstanding position. However, when the hydraulic motor 152 turns or rotates the clevis 154 through 90°, the yoke 158 resides in a longitudinal vertical plane (the phantom position in FIG. 1B) rather than the transverse vertical plane (the solid position in FIG 1B and also FIG. 2) so that the weight of the bolt overcomes the biasing action of the spring 162 with the consequence that the yoke rocks into its phantom position as shown in FIG. 1B.

It is after the release of the bolt by the yoke 158 that the bolt by gravity into a collector 164. The collector 164 is supported through the medium of a bracket structure 166 intergral with the chassis 24. Parallel linkage comprised of a pair of lower arms 168 and a pair of upper arms 170 support the collector 164, there being pivot pins 172 on the chassis 24 and pivot pins 174 on the collector 164. Similarly, the upper arms 170 are pivotally connected to the bracket structure 166 by pins 176 and also to the collector 164 by pins 178. A centrally disposed ram 179, or if preferred, two rams operated in parallel, is utilized for raising and lowering the collector 164, the ram appearing in FIG. 1B including a cylinder 180 and a piston rod 182. The closed end of the cylinder 180 is pivotally supported on the bracket structure 166 by pin 184. The free end of the piston rod 182, however, can be connected directly to the previously mentioned pin 174.

The collector 164 is formed with an open top at 186 so as to receive the bolts as they are gravitationally discharged from the sloping plate 144. Also, the collector 164 has an open bottom at 188. The bottom is normally closed by a pair of arms or jaws 190 that underlie the collector 164 to prevent the accumlated bolts from being dumped until a sufficient number has been collected. The arms 190 are mounted for swinging movement in vertical planes on a shaft 192 extending across the rear of the collector 164. Brackets 194 are mounted on the rear of the collector 164 to support one or more rams 195 comprising a cylinder 196 connected adjacent one end by a pin 198 to the bracket 194. The ram further includes a piston rod 200 having its free end pivotally attached to the arms 190 by a shaft 202.

While a number of rams have been mentioned, it will be appreciated that the drawing has been simplified considerably by not illustrating the hoses or pressure lines for conducting hydraulic fluid to such rams. The hydraulic motor 152 does have a pair of hoses shown in conjunction therewith but the pump for supplying the hydraulic fluid does not appear. The same pump, it might be explained, furnishes hydraulic fluid to the rams that have herein been referred to. Also, the cab in which the operator sits when performing the control functions for the rams and the motor 152 has been omitted.

With the foregoing information in mind, it should be obvious how the processing apparatus that has been disclosed herein functions. First, the vehicle 10 is maneuvered by the operator so that it is in close proximity to the trees the operator wishes to process. Using the boom assembly 42 having the grapple-shear unit 74 at the free end thereof, the operator selects a single tree which has been labeled 204a in FIG. 1A. The capstan 40, together with the attached boom assembly 42, can be swung to either side of the vehicle 10. The operator then extends the boom assembly 42 so as to place the grapple jaws 80 about the trunk of the tree and at the same time positions the shear blades 86 so that they are ready to perform their shearing function. With the grapple jaws 80 tightly gripping the standing tree 204a, the blades 86 can be actuated so as to cut the tree as close to the ground as possible.

After cutting the tree with the blades 86, the mast 66 at the end of the boom assembly 42 is tilted into a horizontal position and this, quite obviously, orients the tree horizontally. This relationship appears in phantom outline in FIG. 1A, the cut tree having been given the reference numeral 204b.

The clamping mechanism 105, which includes the carriage 106 on which the clamping jaws are mounted, is placed in its forward or right-hand position so that the jaws 108, when open, can receive the tree 204b therein and then closed against the tree. Movement of the carriage to the left by the ram 114 will feed or advance the tree 204b in the direction of the shearing mechanism 142. During this portion of the operation, the delimbing blades 98 are actuated against the tree by the rams 104 so that their knife edges 100 are effective to shear off the limbs as the tree 204b moves relative thereto.

Actually, the operator resorts to a manual jog control to advance the tree 204b until the butt end thereof comes up against the blades (shown in said copending application) of the shear mechanism 142. This, if effect, indexes the tree for automatic cycling which the operator can then initiate. After this, the operator is now free to select and cut another standing tree 204a.

While the automatic cycling control is not illustrated, it will be appreciated that the clamping mechanism, which at this moment is in its phantom line position in FIG. 1A, is returned to the forward or right end of the rails 94, the clamping jaws 108 being open during this return trip. The clamping jaws 108, once the carriage 106 is back at the right end of the rails 94, will then be reclosed so as to grip a new portion o the tree 204b. It is at this time that the blades of the shear mechanism 142 are opened so that the movement of the carriage 106 with the clamping jaws 108 against the tree 204b advances or feeds a predetermined length of the tree 204b past the delimbing blades 98, thus removing the limbs from the tree 204b, and causing a predetermined length, say 100 inches, of clean trunk to be extended beyond the shear mechanism 142. The extended or projecting portion of the tree 204b has been given the reference numeral 204c because this will constitute the bolt that will result after operation of the shear mechanism 142. As explained in said copending application, the shear mechanism comprises three blades which close and perform their shearing action to sever the bolt 204c.

The severed bolt 204c drops directly into the notch 160 of the V-shaped yoke 158. As already indicated, this yoke can be turned or rotated through 90° by means of the hydraulic motor 152 so that its axis will be perpendicular to the fore and aft axis of the vehicle 10, one end of the bolt riding on the curved periphery of the plate 144 as it is rotated. This initiates the gravity transfer to the collector 164 because of the leaf spring 162 then yields sufficiently to allow the yoke 158 to rock into its phantom position as it appears in FIG. 1B. This bolt, one end of which appears in phantom outline in this particular Figure after it has been turned through 90°, has been assigned the reference number 204d and is in the process of rolling downwardly into the collector 164.

After the rotary hydraulic motor 152 has rotated the yoke 158 through 90° in one rotative direction, to rotatively shift the bolt 204c, it is rotated in a reverse direction to reposition the yoke 158 as it appears in solid outline in FIG. 1B. In other words, the solid outline position illustrates the yoke 158 in a transverse plane, the phantom outline position of the yoke indicating the position in which it releases the bolt 204d.

The arms 190 function as jaws to close the open bottom 188 of the collector 164. A sizable number of bolts 204d can be accumulated before the collector 164 is ready to be discharged. To effect the discharge of the bolts that have been collected, the parallel linkage comprised of the lower arms 168 and the upper arms 170 is actuated by reason of the ram 179 (or rams if more than one is used) to first raise the collector into its phantom position. It is when the collector 164 has been elevated sufficiently that the ram 195 (or rams) is actuated by retracting its piston rod 200 so as to swing the arms 190 downwardly into their phantom position and thereby permit the bolts to drop out. This produces a pile of bolts or sticks on the ground for subsequent pickup.

We claim:

1. A mobile tree processor comprising a vehicle, a clamping device movable generally longitudinally of said vehicle for gripping and advancing a cut tree, an articulated boom assembly including a main boom and reach boom, said main boom being mounted at one end on said vehicle for rotation about a generally vertical axis and said reach boom having one end pivotally connected to the other end of said main boom, a grapple and shear means carried on the other end of said reach boom for gripping and cutting a standing tree, said grapple and shear means being pivotal so that a tree after it is cut can be tilted into a generally horizontal position and located generally longitudinally of said vehicle for delivering the cut tree to said clamping device, delimbing means on said vehicle for removing branches from said cut tree as it is advanced by said clamping device, a vertically disposed shear mechanism on said vehicle in the path of said cut tree as it is advanced for severing successive bolts from said cut tree, and collector means oriented transversely on said vehicle for receiving said successive bolts, said processor further including means for rotating said bolts from a longitudinally directed position into a transverse position for reception by said collector means.

2. A mobile tree processor in accordance with claim 1 in which said rotating means includes an inclined plate sloping downwardly toward said collector means, said plate having a centrally disposed aperture, a yoke projecting upwardly through said aperture having a V-shaped notch therein, said yoke being rotatable from a first position in which said notch is in a transverse plane so as to accommodate a severed longitudinally directed bolt and a second position in which said notch is in a longitudinal plane, the rotation of said yoke into its second position causing said bolt to rotate from its said longitudinally directed position into its said transverse position.

3. A mobile tree processor in accordance with claim 2 including a pin upon which said yoke is pivoted about an axis generally parallel to a bolt when said bolt is longitudinally directed so that said yoke pivots about said pin to release each successive bolt after said yoke has been rotated into its said second position.

4. A mobile tree processor in accordance with claim 3 including a spring for biasing said yoke into an upright position when in its said first position, said spring yielding to allow rocking movement of said yoke due to the weight of a bolt to release said bolt when said yoke is in its said second position.

5. A mobile tree processor in accordance with claim 4 in which said plate has a circular portion along which one end of the bolt rides as said yoke rotates from its said first position to its second position.

6. A mobile tree processor in accordance with claim 1 in which said collectr means has an open bottom, said pivotal arm means normally closing said open bottom until the bolts that have been accumulated in said collector means are to be dumped.

7. A mobile tree processor in accordance with claim 6 including means for raising said collector means to allow said arms to be swung downwardly to dump the accumulated bolts.

8. A mobile tree processor comprising a vehicle, an articulated boom assembly including a main boom and reach boom, said main boom being pivotally mounted about a generally horizontal axis near one end of said vehicle for rotation about a generally vertical axis and said reach boom having one end pivotally connected to the other end of said main boom, a vertically disposed shear mechanism mounted on said vehicle and also located near said one end thereof, a grapple and tree-cutting means carried on the other end of said reach boom for gripping and cutting a standing tree, said grapple and tree-cutting means being pivotal so that a tree after it is cut can be tilted into a generally horizontal position and located generally longitudinally of said vehicle in substantial alignment with said vertically disposed shear mechanism, delimbing means on said vehicle for removing branches from said cut tree, whereby said shear mechanism severs successive bolts from said cut tree after the delimbing thereof by said delimbing means, collector means disposed on a transverse axis in general longitudinal alignment with said vehicle for receiving said severed bolts, and means intermediate said shear mechanism and said collector means for rotating said bolts from a longitudinally directed position to a transverse position for reception by said collector means.

* * * * *